(12) United States Patent
Guo et al.

(10) Patent No.: US 11,989,885 B2
(45) Date of Patent: May 21, 2024

(54) SPECKLE DETECTION METHOD AND ELECTRONIC DEVICE

(71) Applicant: HONOR DEVICE CO., LTD., Shenzhen (CN)

(72) Inventors: Zhizhi Guo, Shenzhen (CN); Henghui Lu, Beijing (CN); Wenmei Gao, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 668 days.

(21) Appl. No.: 17/260,855

(22) PCT Filed: Sep. 18, 2018

(86) PCT No.: PCT/CN2018/106236
§ 371 (c)(1),
(2) Date: Jan. 15, 2021

(87) PCT Pub. No.: WO2020/015148
PCT Pub. Date: Jan. 23, 2020

(65) Prior Publication Data
US 2021/0264597 A1    Aug. 26, 2021

(30) Foreign Application Priority Data

Jul. 16, 2018 (CN) .......................... 201810776283.7

(51) Int. Cl.
*G06T 7/11* (2017.01)
*G06F 18/241* (2023.01)
(Continued)

(52) U.S. Cl.
CPC .............. *G06T 7/11* (2017.01); *G06F 18/241* (2023.01); *G06T 7/0012* (2013.01); *G06T 7/514* (2017.01);
(Continued)

(58) Field of Classification Search
CPC ......... G06T 7/11; G06T 7/0012; G06T 7/514; G06T 2207/10024; G06T 2207/30088;
(Continued)

(56) References Cited

U.S. PATENT DOCUMENTS 11,317,851 B2   5/2022   Kikuchi et al.
2008/0212894 A1  9/2008  Demirli et al.

FOREIGN PATENT DOCUMENTS

CN   101652784 A   2/2010
CN   105787929 A   7/2016
(Continued)

OTHER PUBLICATIONS

Ian D. Stephen et al, "Carotenoid and melanin pigment coloration affect perceived human health", «Evolution and Human Behavior» , Sep. 22, 2010, pp. 216-227.
(Continued)

*Primary Examiner* — Qian Yang
(74) *Attorney, Agent, or Firm* — WOMBLE BOND DICKINSON (US) LLP

(57) ABSTRACT

A speckle detection method includes: obtaining a to-be-detected image; converting the to-be-detected image into Lab color space to obtain a Lab image; extracting a speckle feature from the Lab image to obtain a speckle feature image, where the speckle feature image includes a skin speckle feature and a subcutaneous speckle feature; and determining a skin speckle and a subcutaneous speckle in the speckle feature image.

17 Claims, 15 Drawing Sheets

(51) Int. Cl.
*G06T 7/00* (2017.01)
*G06T 7/514* (2017.01)
*G06V 10/56* (2022.01)
*G06V 40/10* (2022.01)
*G06V 40/16* (2022.01)

(52) U.S. Cl.
CPC .............. *G06V 10/56* (2022.01); *G06V 40/10* (2022.01); *G06V 40/171* (2022.01); *G06T 2207/10024* (2013.01); *G06T 2207/30088* (2013.01); *G06V 2201/03* (2022.01)

(58) Field of Classification Search
CPC ....... G06T 5/002; G06F 18/241; G06V 10/56; G06V 40/10; G06V 40/171; G06V 2201/03
See application file for complete search history.

(56) References Cited

FOREIGN PATENT DOCUMENTS

| | | | |
|---|---|---|---|
| CN | 106388781 A | | 2/2017 |
| CN | 106529429 A | | 3/2017 |
| CN | 108269290 A | | 7/2018 |
| EP | 2 141 657 | * | 6/2010 |
| WO | WO 2015/121457 | * | 8/2015 |
| WO | 2016080266 A1 | | 5/2016 |

OTHER PUBLICATIONS

Aamir Saeed Malik et al, "Digital Assessment of Facial Acne Vulgaris", «IEEE» , May 12, 2014, pp. 1-5.
Aamir Saeed Malik et al, "Digital Assessment of Facial Acne Vulgaris", «IEEE» , May 12, 2014, pp. 546-550.
Ryszard Goleman et al., "Image Preprocessing Algorithms of Pigmented Skin Lesions and . . . Using Fractal Parameters", «IEEE» , Dec. 3, 2017, pp. 1-4.

* cited by examiner

| $L_{(1,1)}$ | $L_{(1,2)}$ | ... | $L_{(1,W-1)}$ | $L_{(1,W)}$ |
|---|---|---|---|---|
| $L_{(2,1)}$ | $L_{(2,2)}$ | ... | $L_{(2,W-1)}$ | $L_{(2,W)}$ |
| ... | ... | ... | ... | ... |
| $L_{(H-1,1)}$ | $L_{(H-1,2)}$ | ... | $L_{(H-1,W-1)}$ | $L_{(H-1,W)}$ |
| $L_{(H,1)}$ | $L_{(H,2)}$ | ... | $L_{(H,W-1)}$ | $L_{(H,W)}$ |

Channel L

| $b_{(1,1)}$ | $b_{(1,2)}$ | ... | $b_{(1,W-1)}$ | $b_{(1,W)}$ |
|---|---|---|---|---|
| $b_{(2,1)}$ | $b_{(2,2)}$ | ... | $b_{(2,W-1)}$ | $b_{(2,W)}$ |
| ... | ... | ... | ... | ... |
| $b_{(H-1,1)}$ | $b_{(H-1,2)}$ | ... | $b_{(H-1,W-1)}$ | $b_{(H-1,W)}$ |
| $b_{(H,1)}$ | $b_{(H,2)}$ | ... | $b_{(H,W-1)}$ | $b_{(H,W)}$ |

Channel b

| $a_{(1,1)}$ | $a_{(1,2)}$ | ... | $a_{(1,W-1)}$ | $a_{(1,W)}$ |
|---|---|---|---|---|
| $a_{(2,1)}$ | $a_{(2,2)}$ | ... | $a_{(2,W-1)}$ | $a_{(2,W)}$ |
| ... | ... | ... | ... | ... |
| $a_{(H-1,1)}$ | $a_{(H-1,2)}$ | ... | $a_{(H-1,W-1)}$ | $a_{(H-1,W)}$ |
| $a_{(H,1)}$ | $a_{(H,2)}$ | ... | $a_{(H,W-1)}$ | $a_{(H,W)}$ |

Channel a

FIG. 5

| $L'_{(1,1)}$ | $L'_{(1,2)}$ | ... | $L'_{(1,W-1)}$ | $L'_{(1,W)}$ |
|---|---|---|---|---|
| $L'_{(2,1)}$ | $L'_{(2,2)}$ | ... | $L'_{(2,W-1)}$ | $L'_{(2,W)}$ |
| ... | ... | ... | ... | ... |
| $L'_{(H-1,1)}$ | $L'_{(H-1,2)}$ | ... | $L'_{(H-1,W-1)}$ | $L'_{(H-1,W)}$ |
| $L'_{(H,1)}$ | $L'_{(H,2)}$ | ... | $L'_{(H,W-1)}$ | $L'_{(H,W)}$ |

Detail feature component of a channel L

| $b'_{(1,1)}$ | $b'_{(1,2)}$ | ... | $b'_{(1,W-1)}$ | $b'_{(1,W)}$ |
|---|---|---|---|---|
| $b'_{(2,1)}$ | $b'_{(2,2)}$ | ... | $b'_{(2,W-1)}$ | $b'_{(2,W)}$ |
| ... | ... | ... | ... | ... |
| $b'_{(H-1,1)}$ | $b'_{(H-1,2)}$ | ... | $b'_{(H-1,W-1)}$ | $b'_{(H-1,W)}$ |
| $b'_{(H,1)}$ | $b'_{(H,2)}$ | ... | $b'_{(H,W-1)}$ | $b'_{(H,W)}$ |

Detail feature component of a channel b

| $a'_{(1,1)}$ | $a'_{(1,2)}$ | ... | $a'_{(1,W-1)}$ | $a'_{(1,W)}$ |
|---|---|---|---|---|
| $a'_{(2,1)}$ | $a'_{(2,2)}$ | ... | $a'_{(2,W-1)}$ | $a'_{(2,W)}$ |
| ... | ... | ... | ... | ... |
| $a'_{(H-1,1)}$ | $a'_{(H-1,2)}$ | ... | $a'_{(H-1,W-1)}$ | $a'_{(H-1,W)}$ |
| $a'_{(H,1)}$ | $a'_{(H,2)}$ | ... | $a'_{(H,W-1)}$ | $a'_{(H,W)}$ |

Detail feature component of a channel a

FIG. 7

| $L_{(1,1)} - L'_{(1,1)}$ | $L_{(1,2)} - L'_{(1,2)}$ | ... | $L_{(1,W-1)} - L'_{(1,W-1)}$ | $L_{(1,W)} - L'_{(1,W)}$ |
|---|---|---|---|---|
| $L_{(2,1)} - L'_{(2,1)}$ | $L_{(2,2)} - L'_{(2,2)}$ | ... | $L_{(2,W-1)} - L'_{(2,W-1)}$ | $L_{(2,W)} - L'_{(2,W)}$ |
| ... | ... | ... | ... | ... |
| $L_{(H-1,1)} - L'_{(H-1,1)}$ | $L_{(H-1,2)} - L'_{(H-1,2)}$ | ... | $L_{(H-1,W-1)} - L'_{(H-1,W-1)}$ | $L_{(H-1,W)} - L'_{(H-1,W)}$ |
| $L_{(H,1)} - L'_{(H,1)}$ | $L_{(H,2)} - L'_{(H,2)}$ | ... | $L_{(H,W-1)} - L'_{(H,W-1)}$ | $L_{(H,W)} - L'_{(H,W)}$ |

Channel L difference

| $b_{(1,1)} - b'_{(1,1)}$ | $b_{(1,2)} - b'_{(1,2)}$ | ... | $b_{(1,W-1)} - b'_{(1,W-1)}$ | $b_{(1,W)} - b'_{(1,W)}$ |
|---|---|---|---|---|
| $b_{(2,1)} - b'_{(2,1)}$ | $b_{(2,2)} - b'_{(2,2)}$ | ... | $b_{(2,W-1)} - b'_{(2,W-1)}$ | $b_{(2,W)} - b'_{(2,W)}$ |
| ... | ... | ... | ... | ... |
| $b_{(H-1,1)} - b'_{(H-1,1)}$ | $b_{(H-1,2)} - b'_{(H-1,2)}$ | ... | $b_{(H-1,W-1)} - b'_{(H-1,W-1)}$ | $b_{(H-1,W)} - b'_{(H-1,W)}$ |
| $b_{(H,1)} - b'_{(H,1)}$ | $b_{(H,2)} - b'_{(H,2)}$ | ... | $b_{(H,W-1)} - b'_{(H,W-1)}$ | $b_{(H,W)} - b'_{(H,W)}$ |

Channel b difference

| $a_{(1,1)} - a'_{(1,1)}$ | $a_{(1,2)} - a'_{(1,2)}$ | ... | $a_{(1,W-1)} - a'_{(1,W-1)}$ | $a_{(1,W)} - a'_{(1,W)}$ |
|---|---|---|---|---|
| $a_{(2,1)} - a'_{(2,1)}$ | $a_{(2,2)} - a'_{(2,2)}$ | ... | $a_{(2,W-1)} - a'_{(2,W-1)}$ | $a_{(2,W)} - a'_{(2,W)}$ |
| ... | ... | ... | ... | ... |
| $a_{(H-1,1)} - a'_{(H-1,1)}$ | $a_{(H-1,2)} - a'_{(H-1,2)}$ | ... | $a_{(H-1,W-1)} - a'_{(H-1,W-1)}$ | $a_{(H-1,W)} - a'_{(H-1,W)}$ |
| $a_{(H,1)} - a'_{(H,1)}$ | $a_{(H,2)} - a'_{(H,2)}$ | ... | $a_{(H,W-1)} - a'_{(H,W-1)}$ | $a_{(H,W)} - a'_{(H,W)}$ |

Channel a difference

FIG. 8

SPECKLE DETECTION METHOD AND ELECTRONIC DEVICE

CROSS-REFERENCE TO RELATED APPLICATIONS

This application is a National Stage of International Application No. PCT/CN2018/106236, filed on Sep. 18, 2018, which claims priority to Chinese Patent Application No. 201810776283.7, filed on Jul. 16, 2018, both of which are hereby incorporated by reference in their entireties.

TECHNICAL FIELD

This application relates to the field of image processing technologies, and in particular, to a speckle detection method and an electronic device.

BACKGROUND

Severity of speckles on face can directly reflect people's skin age and skin health status, and is also an important factor for people to select cosmetics and skincare products.

Currently, a speckle problem in a face photo may be analyzed by using an application program on a mobile terminal. A speckle contour or an indicated speckle position is marked in the figure, to provide classification of speckle severity. These application programs are usually for a speckle detection region in the face photo. A speckle region is obtained by using a difference between a filtered speckle detection region image and a grayscaled speckle detection region segmentation image, and a speckle score is obtained based on a speckle area proportion.

However, only a skin speckle can be detected by using a detection method used by these application programs, but a subcutaneous speckle cannot be detected. Consequently, a speckle detection result is inaccurate, thereby resulting in an inaccurate quantization and classification result of the speckle severity.

SUMMARY

Embodiments of this application provide a speckle detection method and an electronic device, to resolve a prior-art problem that a speckle detection result is inaccurate.

According to a first aspect, an embodiment of this application provides a speckle detection method. The method may be applied to an electronic device, and the method includes: obtaining a to-be-detected image; converting the to-be-detected image into Lab color space to obtain a Lab image; extracting a speckle feature from the Lab image to obtain a speckle feature image, where the speckle feature image includes a skin speckle feature and a subcutaneous speckle feature; and determining a skin speckle and a subcutaneous speckle in the speckle feature image. In this embodiment of this application, the speckle feature of the to-be-detected image is extracted from the Lab color space, so that not only the skin speckle in the to-be-detected image can be detected, but also the subcutaneous speckle in the to-be-detected image can be detected. In this way, a speckle status of a face may be determined by comprehensively considering the skin speckle and the subcutaneous speckle. Therefore, compared with the prior art in which the speckle status can be detected only based on a detected skin speckle, this application helps increase accuracy of speckle detection.

In a possible design, when the speckle feature in the Lab image is extracted to obtain the speckle feature image, detail feature components of a channel L, a channel a, and a channel b in the Lab image may be separately extracted, and a channel L difference between the channel L and the extracted detail feature component of the channel L, a channel a difference between the channel a and the extracted detail feature component of the channel a, and a channel b difference between the channel b and the extracted detail feature component of the channel b may be determined. The speckle feature image is obtained based on the channel L difference, the channel a difference, and the channel b difference, where the channel L in the speckle feature image is the channel L difference, the channel a in the speckle feature image is the channel a difference, and the channel b in the speckle feature image is the channel b difference. In the foregoing design, the speckle feature in the Lab image can be comparatively accurately extracted, thereby increasing accuracy of speckle detection.

In a possible design, when the detail feature components of the channel L, the channel a, and the channel b in the Lab image are separately extracted, bilateral filtering processing is separately performed on the channel L, the channel a, and the channel b in the Lab image, to obtain the detail feature component of the channel L, the detail feature component of the channel a, and the detail feature component of the channel b. In the foregoing design, smoothing features of the channel L, the channel a, and the channel b may be filtered out through bilateral filtering processing, so that detail features of the channel L, the channel a, and the channel b can be obtained.

In a possible design, when the skin speckle and the subcutaneous speckle in the speckle feature image are determined, a speckle region in the speckle feature image may be determined. For each speckle region, a channel b average value of pixel points in the speckle region is determined. A speckle region whose channel b average value is greater than a first threshold is determined as the skin speckle, and a speckle region whose channel b average value is less than or equal to the first threshold is determined as the subcutaneous speckle. A pixel value of a speckle pixel point in the channel b in the Lab space is greatly different from a pixel value of a normal skin pixel point in the channel b. Therefore, the skin speckle and the subcutaneous speckle can be comparatively accurately detected according to the foregoing design.

In a possible design, when the speckle region in the speckle feature image is determined, a first pixel point in a detection frame may be determined, where a length of the detection frame is less than a length of the speckle feature image, a width of the detection frame is less than a width of the speckle feature image, the detection frame moves in the speckle feature image at a preset step, and a pixel value of the first pixel point satisfies the following formula:

$$r1 < (a1 - T1 \times b1), \text{ where}$$

r1 is the pixel value of the first pixel point, a1 is an average value of pixel values of pixel points in the detection frame, T1 is a preset value, and b1 is a variance of the pixel values of the pixel points in the detection frame.

A second pixel point in the speckle feature image is determined, where a pixel value of the second pixel point satisfies the following formula:

$$r2 < (a2 - T2 \times b2), \text{ where}$$

r2 is the pixel value of the second pixel point, a2 is an average value of pixel values of pixel points in the speckle feature image, T2 is a preset value, and b2 is a variance of the pixel values of the pixel points in the speckle feature image.

The first pixel point and the second pixel point are determined as speckles; and an expansion operation is performed on the speckle, and a corrosion operation is performed on a speckle on which the expansion operation is performed, to obtain the speckle region. In the foregoing design, a pigment point can be comparatively accurately detected by combining local detection and global detection, so that accuracy of speckle detection can be increased.

In a possible design, after the speckle region in the speckle feature image is determined, a speckle region whose area is less than a second threshold and/or whose area is greater than a third threshold may be removed, where the second threshold is less than the third threshold; and/or a speckle region whose ratio of an area to a circumference is less than a fourth threshold may be removed. An area of a speckle on a face is generally within a specific range, and a shape of the speckle is generally approximately a circle. Therefore, in the foregoing design, a region with an excessively small area, an excessively large area, or relatively low roundness in the speckle region is removed, so that accuracy of speckle detection can be increased.

In a possible design, a first feature set may be further determined, and a score of the skin speckle is quantized based on the first feature set, where the first feature set includes at least one of the following features: a uniformity value, a quantity of skin speckles, a speckle area of the skin speckle, or a contrast value of the skin speckle, the uniformity value is used to represent pigment uniformity of the speckle feature image, and the contrast value of the skin speckle is used to represent color contrast of the skin speckle. A second feature set is determined, and a score of the subcutaneous speckle is quantized based on the second feature set, where the second feature set includes at least one of the following features: the uniformity value, a quantity of subcutaneous speckles, a speckle area of the subcutaneous speckle, or a contrast value of the subcutaneous speckle, and the contrast value of the subcutaneous speckle is used to represent color contrast of the subcutaneous speckle. A comprehensive score of speckle detection is determined based on the score of the skin speckle and the score of the subcutaneous speckle. The comprehensive score is displayed, or the score of the skin speckle, the score of the subcutaneous speckle, and the comprehensive score are displayed. In the foregoing design, a speckle score obtained by combining the score of the skin speckle and the score of the subcutaneous speckle has relatively good accuracy.

In a possible design, the score of the skin speckle may be determined according to the following formula:

$$H_1 = w_1 \times A + w_2 \times B_1 + w_3 \times C_1 \times \frac{D_1}{E},$$

where $H_1$ is the score of the skin speckle, A is the uniformity value, $B_1$ is the quantity of skin speckles, $C_1$ is a sum of contrast values of all the skin speckles, $D_1$ is a sum of areas of all the skin speckles, E is an area of the speckle feature image, and $w_1$, $w_2$, and $w_3$ are all preset parameters.

The score of the subcutaneous speckle may be determined according to the following formula:

$$H_2 = w_1 \times A + w_4 \times B_2 + w_5 \times C_2 \times \frac{D_2}{E},$$

where $H_2$ is the score of the subcutaneous speckle, $B_2$ is the quantity of subcutaneous speckles, $C_2$ is a sum of contrast values of all the subcutaneous speckles, $D_2$ is a sum of areas of all the subcutaneous speckles, and both $w_3$ and $w_4$ are preset parameters.

The comprehensive score may be determined according to the following formula:

$$H = y_1 \times H_1 + y_2 \times H_1, \text{ where}$$

H is the comprehensive score, and both $y_1$ and $y_2$ are preset parameters. In the foregoing design, a relatively accurate score may be obtained by comprehensively considering skin uniformity, a speckle contrast value, and a quantity and an area of speckles.

In a possible design, the uniformity value in the first feature set or the second feature set is determined in the following manner: dividing the speckle feature image into several overlapping rectangular regions; determining a standard deviation of pixel values of pixel points in each rectangular region; and determining an average value of the standard deviations of the pixel values of all the rectangular regions, to obtain the uniformity value. In the foregoing design, the standard deviation of the pixel values of each rectangular region is calculated, and then the average value of the standard deviations of the pixel values of all the rectangular regions is calculated, so that uniformity of skin pigments can be comparatively accurately determined.

In a possible design, the contrast value of the skin speckle in the first feature set may be determined in the following manner: determining an average value of first pixel values of pixel points in each skin speckle and an average value of second pixel values of pixel points in the speckle feature image; and determining a ratio of the average value of the first pixel values to the average value of the second pixel values, to obtain the contrast value of the skin speckle. The contrast value of the subcutaneous speckle in the second feature set may be determined in the following manner: determining an average value of third pixel values of pixel points in each subcutaneous speckle, and the average value of the second pixel values; and determining a ratio of the average value of the third pixel values to the average value of the second pixel values, to obtain the contrast value of the subcutaneous speckle. In the foregoing design, a color depth of the skin speckle and a color depth of the subcutaneous speckle are separately compared with a color depth of normal skin, so that the contrast value of the skin speckle and the contrast value of the subcutaneous speckle can be comparatively accurately obtained.

In a possible design, the to-be-detected image may be converted into a grayscale image before the to-be-detected image is converted into the Lab color space. A pixel point whose pixel value is greater than a fifth threshold is removed from the grayscale image. A pixel grayscale value of a face spot region caused by light reflection in the grayscale image is obviously greater than a pixel grayscale value of a normal skin region. Therefore, in the foregoing design, the spot region may be removed, to reduce impact of the spot region on speckle detection, and further increase accuracy of speckle detection.

According to a second aspect, an embodiment of this application further provides an electronic device, including a memory, configured to store a computer program; and a processing module, configured to invoke the computer program stored in the storage module, to perform the following operations: obtaining a to-be-detected image; converting the to-be-detected image into Lab color space to obtain a Lab image; extracting a speckle feature from the Lab image to obtain a speckle feature image, where the speckle feature image includes a skin speckle feature and a subcutaneous speckle feature; and determining a skin speckle and a subcutaneous speckle in the speckle feature image.

In a possible design, when extracting the speckle feature from the Lab image to obtain the speckle feature image, the processing module is specifically configured to: separately extract detail feature components of a channel L, a channel a, and a channel b in the Lab image; determine a channel L difference between the channel L and the extracted detail feature component of the channel L, a channel a difference between the channel a and the extracted detail feature component of the channel a, and a channel b difference between the channel b and the extracted detail feature component of the channel b; and obtain the speckle feature image based on the channel L difference, the channel a difference, and the channel b difference, where the channel L in the speckle feature image is the channel L difference, the channel a in the speckle feature image is the channel a difference, and the channel b in the speckle feature image is the channel b difference.

In a possible design, when separately extracting the detail feature components of the channel L, the channel a, and the channel b in the Lab image, the processing module is specifically configured to: separately perform bilateral filtering processing on the channel L, the channel a, and the channel b in the Lab image, to obtain the detail feature component of the channel L, the detail feature component of the channel a, and the detail feature component of the channel b.

In a possible design, when determining the skin speckle and the subcutaneous speckle in the speckle feature image, the processing module is specifically configured to: determine a speckle region in the speckle feature image; for each speckle region, determine a channel b average value of pixel points in the speckle region; and determine a speckle region whose channel b average value is greater than a first threshold as the skin speckle, and a speckle region whose channel b average value is less than or equal to the first threshold as the subcutaneous speckle.

In a possible design, when determining the speckle region in the speckle feature image, the processing module is specifically configured to: determine a first pixel point in a detection frame, where a length of the detection frame is less than a length of the speckle feature image, a width of the detection frame is less than a width of the speckle feature image, the detection frame moves in the speckle feature image at a preset step, and a pixel value of the first pixel point satisfies the following formula:

$r1 < (a1 - T1 \times b1)$, where r1 is the pixel value of the first pixel point, a1 is an average value of pixel values of pixel points in the detection frame, T1 is a preset value, and b1 is a variance of the pixel values of the pixel points in the detection frame;

determine a second pixel point in the speckle feature image, where a pixel value of the second pixel point satisfies the following formula:

$r2 < (a2 - T2 \times b2)$, where r2 is the pixel value of the second pixel point, a2 is an average value of pixel values of pixel points in the speckle feature image, T2 is a preset value, and b2 is a variance of the pixel values of the pixel points in the speckle feature image;

determine the first pixel point and the second pixel point as speckles; and perform an expansion operation on the speckle, and perform a corrosion operation on a speckle on which the expansion operation is performed, to obtain the speckle region.

In a possible design, the processing module is further configured to: after the speckle region in the speckle feature image is determined, remove a speckle region whose area is less than a second threshold and/or whose area is greater than a third threshold, where the second threshold is less than the third threshold; and/or remove a speckle region whose ratio of an area to a circumference is less than a fourth threshold.

In a possible design, the processing module is further configured to: determine a first feature set, and quantize a score of the skin speckle based on the first feature set, where the first feature set includes at least one of the following features: a uniformity value, a quantity of skin speckles, a speckle area of the skin speckle, or a contrast value of the skin speckle, the uniformity value is used to represent pigment uniformity of the speckle feature image, and the contrast value of the skin speckle is used to represent color contrast of the skin speckle; determine a second feature set, and quantize a score of the subcutaneous speckle based on the second feature set, where the second feature set includes at least one of the following features: the uniformity value, a quantity of subcutaneous speckles, a speckle area of the subcutaneous speckle, or a contrast value of the subcutaneous speckle, and the contrast value of the subcutaneous speckle is used to represent color contrast of the subcutaneous speckle; determine a comprehensive score of speckle detection based on the score of the skin speckle and the score of the subcutaneous speckle; and display the comprehensive score, or display the score of the skin speckle, the score of the subcutaneous speckle, and the comprehensive score.

In a possible design, the processing module determines the score of the skin speckle according to the following formula:

$$H_1 = w_1 \times A + w_2 \times B_1 + w_3 \times C_1 \times \frac{D_1}{E},$$

where $H_1$ is the score of the skin speckle, A is the uniformity value, $B_1$ is the quantity of skin speckles, $C_1$ is a sum of contrast values of all the skin speckles, $D_1$ is a sum of areas of all the skin speckles, E is an area of the speckle feature image, and $w_1$, $w_2$, and $w_3$ are all preset parameters.

The processing module determines the score of the subcutaneous speckle according to the following formula:

$$H_2 = w_1 \times A + w_4 \times B_2 + w_5 \times C_2 \times \frac{D_2}{E},$$

where $H_2$ is the score of the subcutaneous speckle, $B_2$ is the quantity of subcutaneous speckles, $C_2$ is a sum of contrast values of all the subcutaneous speckles, $D_2$ is a sum of areas of all the subcutaneous speckles, and both $w_3$ and $w_4$ are preset parameters.

The processing module determines the comprehensive score according to the following formula:

$H = y_1 \times H_1 + y_2 \times H_1$, where

H is the comprehensive score, and both $y_1$ and $y_2$ are preset parameters.

In a possible design, the processing module is further configured to determine the uniformity value in the first feature set or the second feature set in the following manner: dividing the speckle feature image into several overlapping rectangular regions; determining a standard deviation of pixel values of pixel points in each rectangular region; and determining an average value of the standard deviations of the pixel values of all the rectangular regions, to obtain the uniformity value.

In a possible design, the processing module is further configured to determine the contrast value of the skin speckle in the first feature set in the following manner: determining an average value of first pixel values of pixel points in each skin speckle and an average value of second pixel values of pixel points in the speckle feature image; and determining a ratio of the average value of the first pixel values to the average value of the second pixel values, to obtain the contrast value of the skin speckle. The processing module is further configured to determine the contrast value of the subcutaneous speckles in the second feature set in the following manner: determining an average value of third pixel values of pixel points in each subcutaneous speckle, and the average value of the second pixel values; and determining a ratio of the average value of the third pixel values to the average value of the second pixel values, to obtain the contrast value of the subcutaneous speckle.

In a possible design, the processing module is further configured to: convert the to-be-detected image into a grayscale image before converting the to-be-detected image into the Lab color space; and remove a pixel point whose pixel value is greater than a fifth threshold from the grayscale image.

According to a third aspect, an embodiment of this application provides a computer storage medium. The computer storage medium stores a program instruction, and when the program instruction is run on an electronic device, the electronic device is enabled to perform the method according to any one of the first aspect and the possible designs of the first aspect in the embodiments of this application.

According to a fourth aspect, an embodiment of this application provides a computer program product. When the computer program product runs on an electronic device, the electronic device is enabled to perform the method according to any one of the first aspect and the possible designs of the first aspect in the embodiments of this application.

According to a fifth aspect, an embodiment of this application provides a chip. The chip is coupled to a memory in an electronic device, to perform the method in any one of the first aspect and the possible designs of the first aspect in the embodiments of this application.

In addition, for technical effects brought by the second aspect to the fifth aspect, refer to the description in the first aspect. Details are not described herein.

It should be noted that "coupling" in the embodiments of this application means that two components are directly or indirectly combined with each other.

BRIEF DESCRIPTION OF DRAWINGS

FIG. 4A-1 and FIG. 4A-2 are a schematic diagram of a preview user interface according to an embodiment of this application;

FIG. 5 is a schematic diagram of a channel L, a channel a, and a channel b of a Lab image according to an embodiment of this application;

FIG. 7 is a schematic diagram of a detail feature component of a channel L, a detail feature component of a channel a, and a detail feature component of a channel b according to an embodiment of this application;

FIG. 8 is a schematic diagram of a channel L difference, a channel a difference, and a channel b difference according to an embodiment of this application;

DESCRIPTION OF EMBODIMENTS

Embodiments disclosed in this application may be applied to an electronic device. In some embodiments of this application, the electronic device may be a portable electronic device that includes functions such as a personal digital assistant and/or a music player, for example, a mobile phone, a tablet computer, a wearable device (for example, a smartwatch) with a wireless communication function, or a vehicle-mounted device. An example embodiment of the portable electronic device includes but is not limited to a portable electronic device using iOS®, Android®, Microsoft®, or another operating system. The portable electronic device may alternatively be a laptop computer (Laptop) with a touch-sensitive surface (for example, a touch panel). It should be further understood that, in some other embodiments of this application, the electronic device may alternatively be a desktop computer with a touch-sensitive surface (for example, a touch panel).

Figure 1:
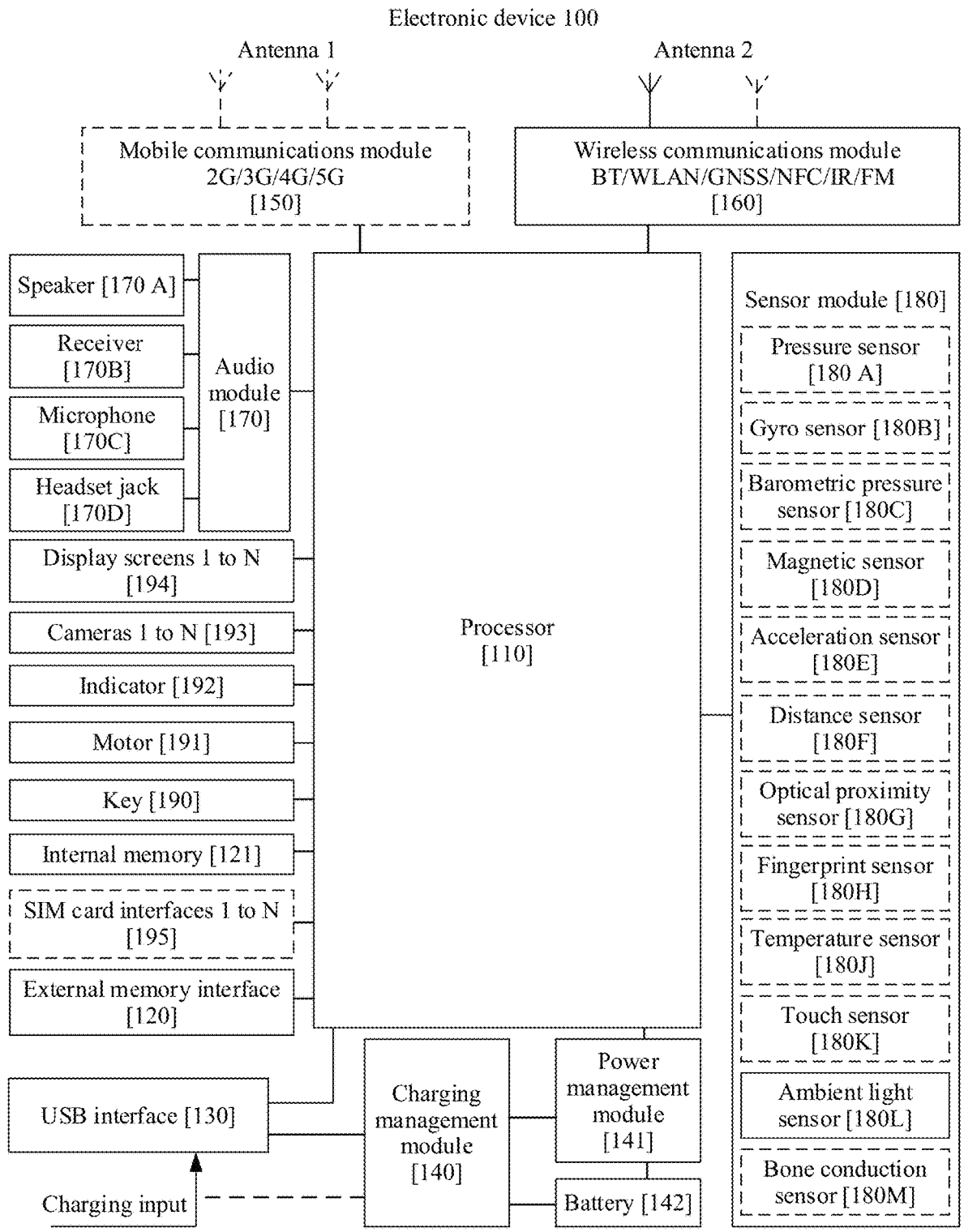
FIG. 1 is a schematic structural diagram of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 2, a wireless communications module 160, an audio module 170, a speaker 170A, a receiver 170B, a microphone 170C, a headset jack 170D, a sensor module 180, a key 190, a motor 191, an indicator 192, a camera 193, a display screen 194, and the like. The sensor module 180 includes an ambient light sensor 180L. In addition, the sensor module 180 may further include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, a bone conduction sensor 180M, and the like. In some other embodiments, the electronic device 100 in this embodiment of this application may further include an antenna 1, a mobile communications module 150, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural processing unit (neural-network processing unit, NPU), and/or the like. Different processing units may be independent components, or may be integrated into one or more processors.

In some embodiments, a memory may be further disposed in the processor 110, and is configured to store an instruction and data. For example, the memory in the processor 110 may be a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby increasing efficiency of the electronic device.

In some other embodiments, the processor 110 may further include one or more interfaces. For example, the interface may be the universal serial bus (universal serial bus, USB) interface 130. For another example, the interface may alternatively be an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, or the like. It may be understood that in this embodiment of this application, different modules of the electronic device 100 may be connected through an interface, so that the electronic device 100 can implement different functions such as photographing and processing. It should be noted that a connection manner of the interface in the electronic device 100 is not limited in this embodiment of this application.

The USB interface 130 is an interface that conforms to a USB standard specification. For example, the USB interface 130 may include a mini-USB interface, a micro-USB interface, a USB Type-C interface, and the like. The USB interface 130 may be configured to connect to a charger to charge the electronic device 100, or may be configured to perform data transmission between the electronic device 100 and a peripheral device. The USB interface may be alternatively configured to connect to a headset, to play audio by using the headset. The interface may be further configured to connect to another electronic device, for example, an AR device.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification, on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation by using the antenna 1. In some embodiments, at least some functional modules in the mobile communications module 150 may be disposed in the processor 110. In some embodiments, at least some functional modules in the mobile communications module 150 and at least some modules in the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same component as the mobile communications module 150 or another functional module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation by using the antenna 2.

In some embodiments, the antenna 1 and the mobile communications module 150 of the electronic device 100 are coupled, and the antenna 2 and the wireless communications module 160 of the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), the BT, the GNSS, the WLAN, the NFC, the FM, the IR technology, and/or the like. The GNSS may include a global positioning system (global positioning system, GPS), the global navigation satellite system (global navigation satellite system, GLONASS), a Beidou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and render an image. The processor 110 may include one or more GPUs, and execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a micro-oLed, a quantum dot light emitting diode (quantum dot light emitting diodes, QLED), or the like. In some embodiments, the electronic device 100 may include one or N display screens 194, where N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is turned on, light is transmitted to a light-sensitive element of the camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge-coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to: perform Fourier transform on frequency energy, and the like.

The video codec is configured to compress or decompress a digital video. The electronic device 100 may support one or more types of video codecs. In this way, the electronic device 100 can play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external storage card (for example, a micro SD card), to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code, and the executable program code includes an instruction. The processor 110 runs the instruction stored in the internal memory 121, to implement various function applications and data processing of the electronic device 100. The internal memory 121 may include a program storage region and a data storage region. The program storage region may store an operating system, an application required by at least one function (for example, a voice play function or an image play function), and the like. The data storage region may store data (such as audio data and an address book) created during use of the electronic device 100, and the like. In addition, the internal memory 121 may include a high-speed random access memory, and may further include a nonvolatile memory such as at least one magnetic disk storage device, a flash memory, or a universal flash storage (universal flash storage, UFS).

The electronic device 100 can implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, or is configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode over the speaker 170A.

The receiver 170B, also referred to as an "earpiece", is configured to convert an audio electrical signal into a sound signal. When a call is answered or a voice message is listened to by using the electronic device 100, the receiver 170B may be put close to a human ear to listen to a voice.

The microphone 170C, also referred to as a "mic" or a "sound conducting device", is configured to convert a sound signal into an electrical signal. When making a call or sending a voice message, a user may make a sound near the microphone 170C through the mouth of the user to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and may further identify a sound source, so as to implement a directional recording function and the like.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A, such as a resistive pressure sensor, an inductive pressure sensor, and a capacitive pressure sensor. The capacitive pressure sensor may include at least two parallel plates made of a conductive material. When a force is applied to the pressure sensor 180A, capacitance between electrodes changes. The electronic device 100 determines pressure intensity based on a change in the capacitance. When a touch operation is performed on the display screen 194, the electronic device 100 detects intensity of the touch operation by using the pressure sensor 180A. The electronic device 100 may also calculate a touch position based on a detection signal of the pressure sensor 180A. In some embodiments, touch operations that are performed to a same touch position but have different touch operation intensity may correspond to different operation instructions. For example, when a touch operation whose touch operation intensity is less than a first pressure threshold is performed on a Messages application icon, an instruction for viewing a Messages message is performed. When a touch operation whose touch operation intensity is greater than or equal to the first pressure threshold is performed on the Messages application icon, an instruction for creating a new Messages message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using an atmospheric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel", The touch sensor 180K may be disposed on the display screen 194, and the touch sensor 180K and the display screen 194 constitute a "touchscreen". The touch sensor 180K is configured to detect a touch operation on or near the touch sensor 180K. The touch sensor may transmit the detected touch operation to the application processor to determine a type of the touch event. A visual output related to the touch operation may be provided by using the display screen 194. In some other embodiments, the touch sensor 180K may also be disposed on a surface of the electronic device 100 at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or a touch key. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed to different regions of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 simultaneously. The plurality of cards may be of a same type or different types. The SIM card interface 195 may further be compatible with different types of SIM cards. The SIM card interface 195 may further be compatible with an external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100 and cannot be separated from the electronic device 100.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by using hardware, software, or a combination of software and hardware.

The following describes this embodiment of this application in detail by using the electronic device 100 as an example.

In addition, it should be understood that an application program supported by the electronic device in this embodiment of this application may include a photographing application, for example, a camera. In addition, the application program supported by the electronic device may further include a plurality of other applications, for example, drawing, a game, a phone, a video player, a music player, photo management, a browser, a calendar, and a clock.

The application supported by the electronic device in this embodiment of this application may further include a skin test application. The skin test application is to detect a facial skin feature (for example, a wrinkle, a pore, a blackhead, a speckle, or a red zone of the facial skin) of a user by using a photographed face image, and may provide a detection result report for the user. For example, the detection result report may include but is not limited to a score of each feature on the facial skin, comprehensive analysis on the facial skin, and the like, and may further display a face photo of the user, and mark a corresponding problem on the face image based on a detection result of each feature, for example, a blackhead is marked in a bulb region of a nose, a wrinkle is marked in a forehead region, and a speckle is marked in a cheek region. It may be understood that the detection result report may be presented to the user in a user interface. For example, the detection result report may be shown in a user interface 200 shown in FIG. 2. The detection result report includes a comprehensive score, a skin age, and scores of a pore, a blackhead, a fine wrinkle, a speckle, and a red zone. In some other embodiments, the user interface 200 may further include a virtual button 201, a virtual button 202, a virtual button 203, a virtual button 204, and a virtual button 205. The virtual button 201 is used as an example. The electronic device 100 responds to an operation on the virtual button 201, a specific skincare suggestion for a pore is displayed on the display screen 194. For functions of the virtual button 202, the virtual button 203, the virtual button 204, and the virtual button 205, refer to a function of the virtual button 201. Details are not described herein.

To enable the electronic device to test the facial skin of the user more accurately, for example, in a user skin test solution in this embodiment of this application, a photographing condition detection module, an image quality detection module, a region of interest (region of interest, ROI) detection module, a skin feature detection module, a result analysis module, and the like may be integrated into the processor 110. In some embodiments, the photographing condition detection module, the image quality detection module, the region of interest (region of interest, ROI) detection module, the skin feature detection module, the result analysis module, and the like may be integrated into the application processor in the processor 110. In some other embodiments, an artificial intelligence (artificial intelligence, AI) chip is integrated into the processor 110, and the photographing condition detection module, the image quality detection module, the region of interest (region of interest, ROI) detection module, the skin feature detection module, the result analysis module, and the like are integrated into the AI chip, to implement user skin test.

The photographing condition detection module may detect a current photographing condition, to indicate a user to perform photographing under a required photographing condition, to ensure that a photographed image meets a requirement. This ensures accuracy of skin test based on the image. For example, the required photographing condition includes: sufficient ambient light, a proper distance (for example, about 25 cm) between a face and an electronic device, a face being upright, an eye being opened and closed, no glasses being worn, fringe-free on a forehead as much as possible, accurate focusing, no obvious jitter, and the like.

After the photographing condition detection module successfully performs detection, the processor 110 enables intelligent light compensation. For example, when the current photographing condition meets the requirement, the photographing condition detection module determines that the detection succeeds. Specifically, in this embodiment of this application, the electronic device may use different light compensation modes (for example, a flashlamp mode and a flashlight mode) to supplement light on the face of the user, to meet different facial skin feature detection requirements. After facial light of the user is compensated, the processor 110 may control the camera 193 to photograph the face of the user to obtain a face image of the face of the user.

The image quality detection module may detect quality of the face image, to ensure that the photographed image meets different facial skin feature detection requirements.

After the image quality detection module detects that the image quality meets a requirement, the ROI detection module may determine a to-be-detected ROI from the face image. For example, an ROI of a blackhead is a small region on a bulb of a nose.

The skin feature detection module may separately detect a facial skin feature in the determined ROI, for example, detect a wrinkle, a pore, a blackhead, a speckle, a red zone, or an oil production degree in the skin.

The result analysis module may analyze a detection result of the facial skin feature that is obtained by the skin feature detection module through detection, and provide a score, a score ranking, and the like of each detection item for each skin feature.

In addition, in some embodiments, the processor 110 may further be integrated into an image preprocessing module. The image preprocessing module may perform compression, cropping, and the like on the photographed face image, so that the ROI detection module, the skin feature detection module, and the like perform subsequent processing.

To output an analysis result of the face image, output the score of each detection item, or the like, the processor 110 may further display a detection report obtained through detection (including a region, in a face image, of a detection result of each feature, for example, a blackhead is marked in bulb region of a nose, a wrinkle is marked in a forehead region, a speckle is marked in a cheek region, and the like; and a score of each detection item and the like) on the display screen 194 for the user to view. This improves user experience.

To achieve an objective of detecting a facial skin feature of a user more accurately, an embodiment of this application provides a speckle detection method, to detect a speckle status of a face. In this embodiment of this application, a skin speckle and a subcutaneous speckle in a face image may be detected based on a Lab color model, so that the speckle status of the face may be determined by comprehensively considering the skin speckle and the subcutaneous speckle. Therefore, compared with the prior art in which the speckle status can be detected only based on a detected skin speckle, this application helps increase accuracy of speckle detection.

Figure 3:
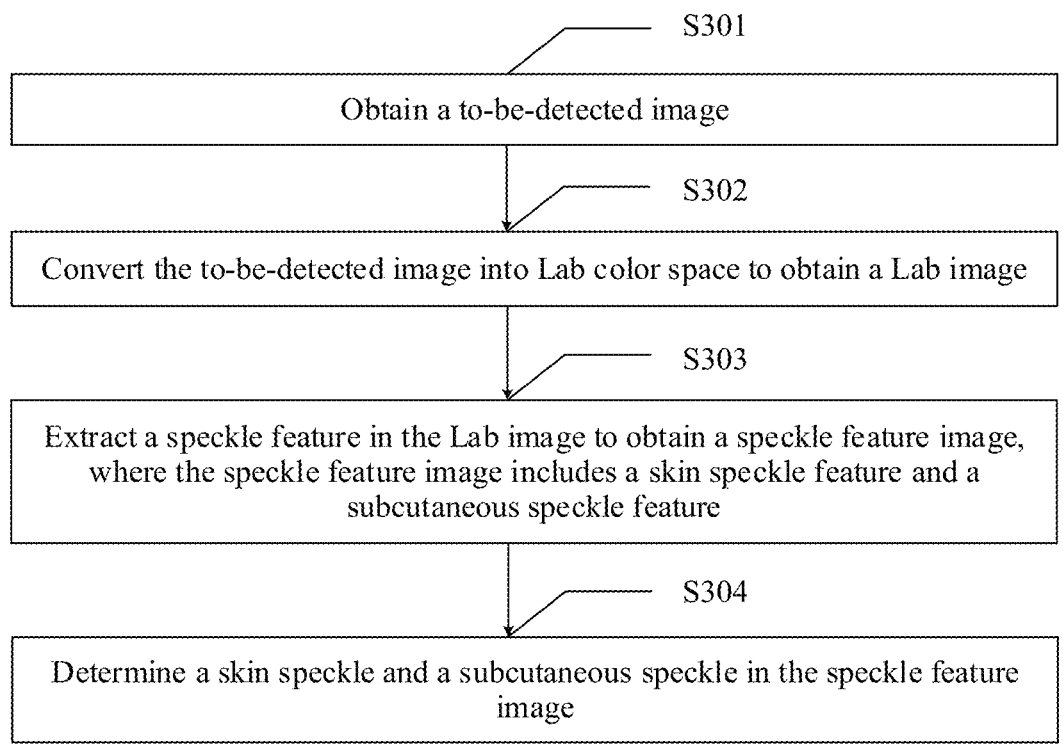
FIG. 3 is a schematic flowchart of a speckle detection method according to an embodiment of this application.

FIG. 3 is a schematic flowchart of a speckle detection method according to an embodiment of this application. The method may be applied to the electronic device 100, and includes the following steps.

S301: Obtain a to-be-detected image.

Figures 1, 4A:
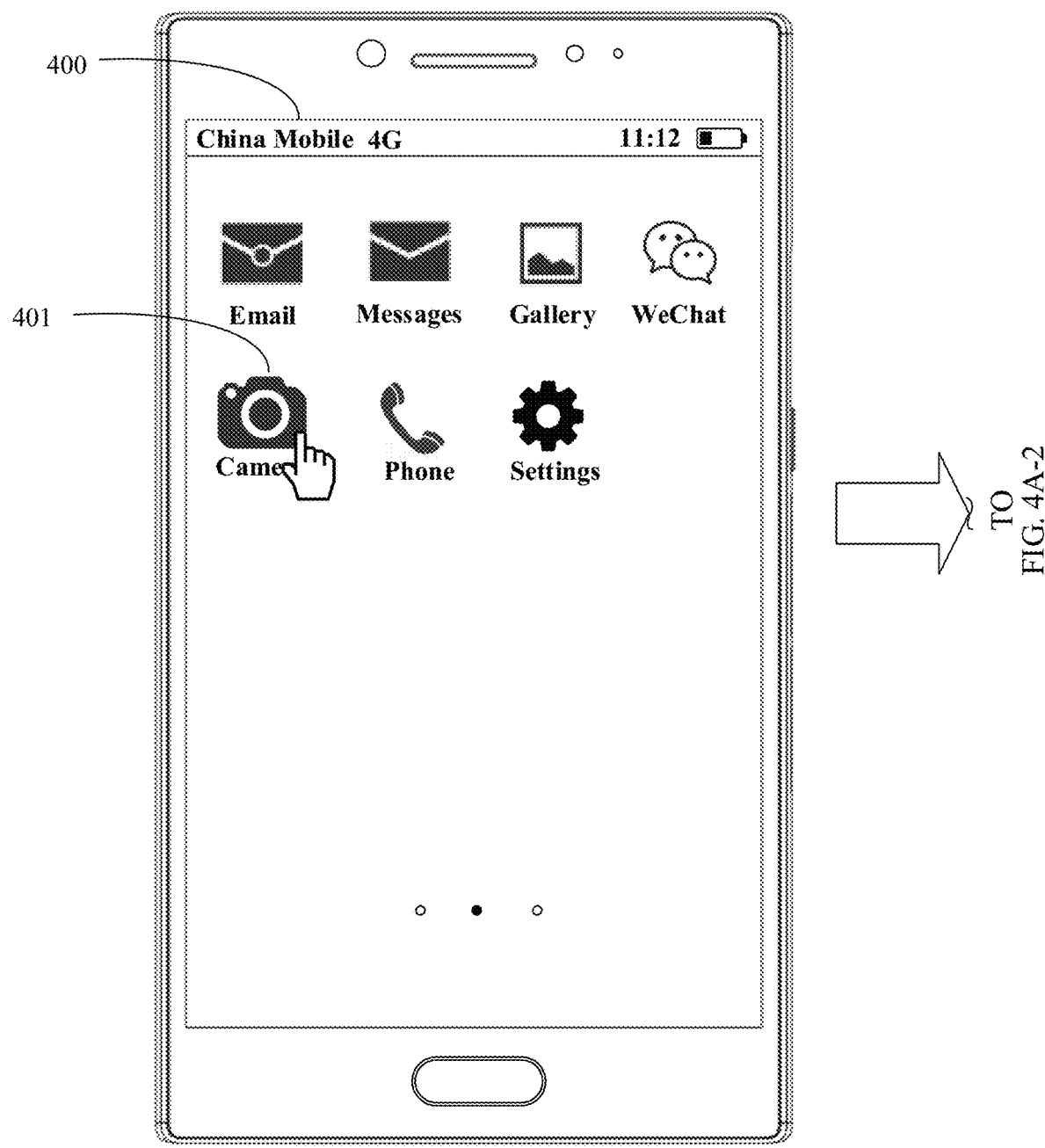
Figures 2, 4A:
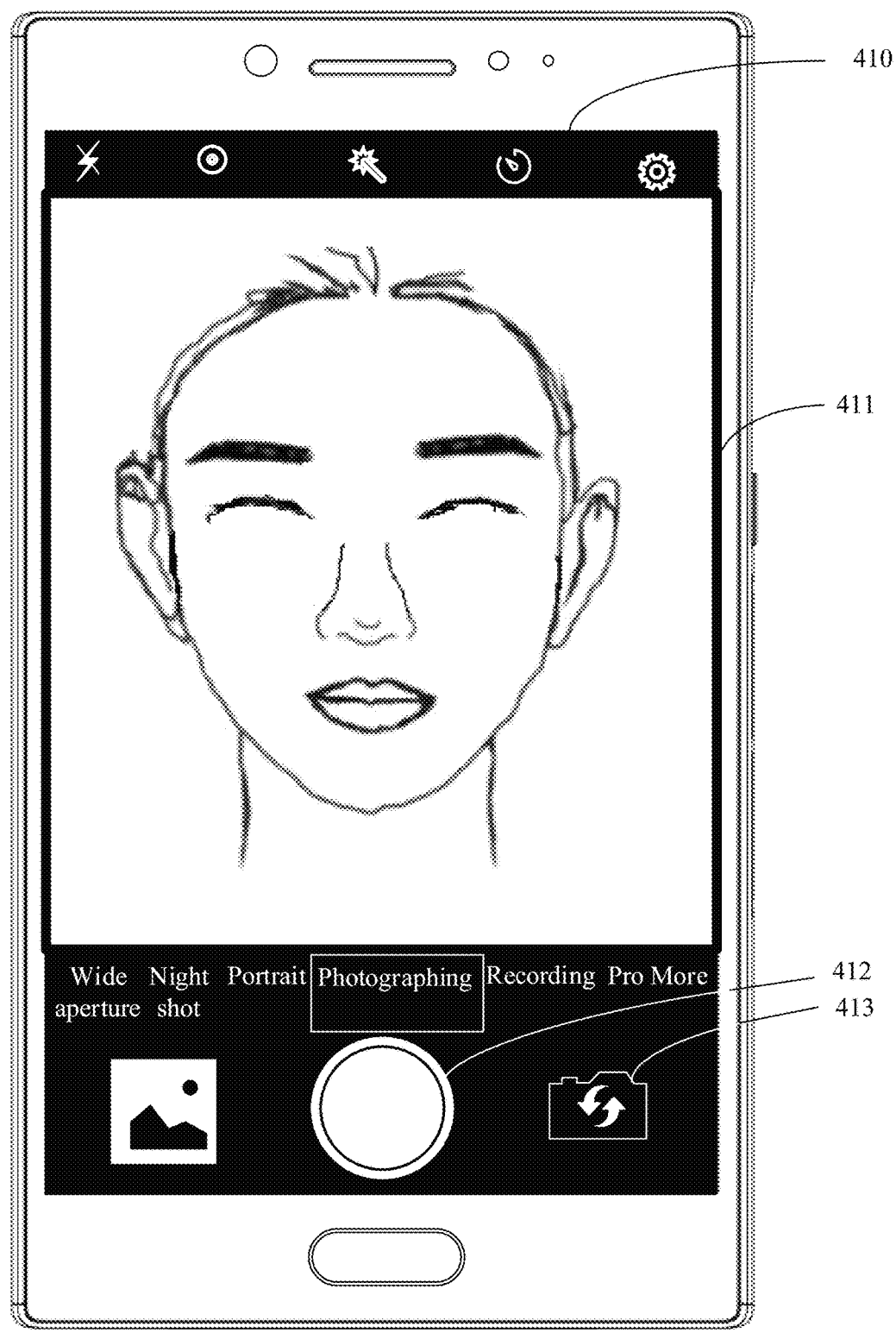

The display screen 194 of the electronic device 100 may display a photographing preview interface in response to an operation of a user. The display screen 194 displays a home screen, where the home screen includes a camera icon. For example, the home interface is a user interface 400 shown in FIG. 4A-1. The user interface 400 includes a camera icon 401. In addition, the user interface 400 may further include an email icon, a Messages icon, a gallery icon, a WeChat icon, and the like. For example, the electronic device 100 may display the photographing preview interface on the display screen 194 in response to an operation of the user on the camera icon 401. In this case, the photographing preview interface may be a user interface 410 shown in FIG. 4A-2. The user interface 410 includes a preview region 411. The preview region 411 displays an image captured by using the camera of the electronic device 100.

It should be noted that when the electronic device 100 includes both a front-facing camera and a rear-facing camera, if the electronic device 100 enables the front-facing camera but does not enable the rear-facing camera, the image displayed on the photographing preview interface is an image captured by using the front-facing camera. If the electronic device 100 enables the rear-facing camera but does not enable the rear-facing camera, the image displayed on the photographing preview interface is an image collected by using the rear-facing camera. In addition, it should be further noted that the electronic device 100 may not include the camera, but the electronic device 100 may be connected to another electronic device including a camera, to collect the image by using the camera of the external device.

Figure 4B:
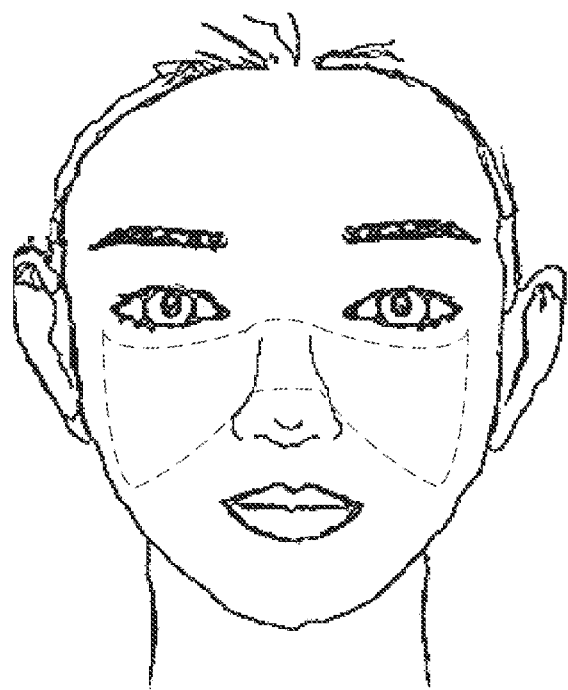
FIG. 4B is a schematic flowchart of a speckle detection method according to an embodiment of this application.

When the display screen 194 displays the photographing preview interface, the electronic device 100 may detect a current photographing condition by using a photographing condition detection function, to indicate the user to perform photographing under a required photographing condition, so as to ensure that a photographed image meets a requirement. When the current photographing condition meets the photographing requirement, the photographing condition detection function may perform light compensation on the face of the user by using an intelligent light compensation function, to meet different facial skin feature detection requirements. After facial light of the user is compensated, the camera 193 may be used to photograph the face of the user to obtain a face image of the face of the user. Then, an image quality detection function may be used to detect quality of the face image, to ensure that the photographed image meets different facial skin feature detection requirements. After it is determined that the face image meets the requirement, an ROI detection function may be used to determine an ROI from the face image, where the ROI is the to-be-detected image. The ROI detection function may obtain a to-be-detected ROI image after performing key point detection by using a face detection technology and a face feature point positioning technology. The ROI is a region including the cheeks on both sides and the nose, and is a range of a dashed frame shown in FIG. 4B.

After step S301 is performed and before step S302 is performed, a spot region in the to-be-detected image may be removed.

In a possible implementation, the to-be-detected image is converted into a grayscale image. A pixel point whose pixel value is greater than a fifth threshold is removed from the grayscale image. A pixel grayscale value of a face spot region caused by light reflection in the grayscale image is obviously greater than a pixel grayscale value of a normal skin region, and the face spot region exists in a flake shape. Therefore, the spot region in the to-be-detected image may be removed by removing a pixel point whose pixel value is greater than a preset threshold from the grayscale image of the to-be-detected image.

Optionally, after the spot region in the to-be-detected image is removed, normalization processing may be further performed on a pixel value in the to-be-detected image. For example, a pixel value obtained after normalization, of a pixel point in the to-be-detected image may be in a range of [0, 255]. Certainly, the pixel value obtained after normalization, of the pixel point in the to-be-detected image may alternatively be in another range. A range of the pixel value obtained after normalization, of the pixel point is not specifically limited in this embodiment of this application.

S302: Convert the to-be-detected image into Lab color space to obtain a Lab image.

The Lab color space includes three channels: a channel L, a channel a, and a channel b. L indicates luminosity (luminosity), a indicates a range from magenta to green, and b indicates a range from yellow to blue. Each pixel point in the Lab image of the to-be-detected image has three parameters: a value L, a value a, and a value b. As shown in FIG. 5, values L of all pixel points in the Lab image of the to-be-detected image constitute the channel L, where $L_{(x, y)}$ represents a value L of a pixel point in the $x^{th}$ row and the $y^{th}$ column. Similarly, values a of all the pixel points in the Lab image of the to-be-detected image constitute the channel a, where $a_{(x, y)}$ represents a value a of the pixel point in the $x^{th}$ row and the $y^{th}$ column. Values b of all the pixel points in the Lab image of the to-be-detected image constitute the channel b, where $b_{(x, y)}$ represents a value b of the pixel point in the $x^{th}$ row and the $y^{th}$ column. W is the length of the Lab image, and H is the width of the Lab image.

A pixel value of a speckle pixel point in the channel b in the Lab space is greatly different from a pixel value of a normal skin pixel point in the channel b. Therefore, after the to-be-detected image is converted into the Lab color space, a speckle feature is extracted, so that accuracy of speckle detection can be increased.

Figure 6:
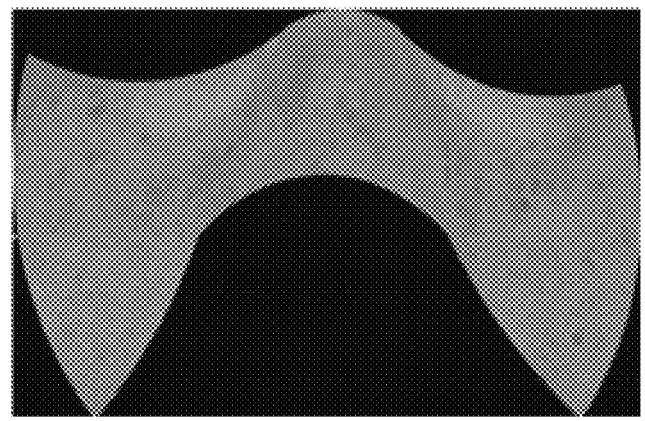
FIG. 6 is a schematic diagram of a speckle feature image according to an embodiment of this application.

S303: Extract the speckle feature from the Lab image to obtain a speckle feature image, where the speckle feature image includes a skin speckle feature and a subcutaneous speckle feature. The speckle feature image may be shown in FIG. 6.

In an implementation, step S303 may be implemented by using steps A1 to A3:

A1: Separately extract detail feature components of the channel L, the channel a, and the channel b in the Lab image. The detail feature components of the channel L, the channel a, and the channel b may be shown in FIG. 7. Processing is separately performed on the channel L, the channel a, and the channel b in the Lab image to extract a detail feature of each channel, so as to obtain the detail feature components of the channel L, the channel a, and the channel b.

For example, bilateral filtering processing is separately performed on the channel L, the channel a, and the channel b in the Lab image, to obtain the detail feature component of the channel L, the detail feature component of the channel a, and the detail feature component of the channel b. Certainly, the detail feature components of the channel L, the channel a, and the channel b in the Lab image may alternatively be separately extracted in another manner. For example, pixel points with relatively small gradients in the channel L, the channel a, and the channel b are filtered out separately, and pixel points with relatively large gradients in the channel L, the channel a, and the channel b are reserved as the detail feature components of the channel L, the channel a, and the channel b in the Lab image. A manner of extracting the detail feature components of the channel L, the channel a, and the channel b in the Lab image is not specifically limited in this embodiment of this application.

A2: Determine a channel L difference between the channel L and the extracted detail feature component of the channel L, a channel a difference between the channel a and the extracted detail feature component of the channel a, and a channel b difference between the channel b and the extracted detail feature component of the channel b. The channel L difference, the channel a difference, and the channel b difference may be shown in FIG. 8.

A3: Obtain the speckle feature image based on the channel L difference, the channel a difference, and the channel b difference, where the channel L in the speckle feature image is the channel L difference, the channel a in the speckle feature image is the channel a difference, and the channel b in the speckle feature image is the channel b difference. To be specific, the channel L difference, the channel a difference, and the channel b difference are combined to obtain the speckle feature image, where the L value of the pixel point located in the $x^{th}$ row and the $y^{th}$ column in the speckle feature image is equal to $L_{(x,y)}-L'_{(x,y)}$, the value a is equal to $a_{(x,y)}-a'_{(x,y)}$, and the value b is equal to $b_{(x,y)}-b'_{(x,y)}$.

Figure 9:
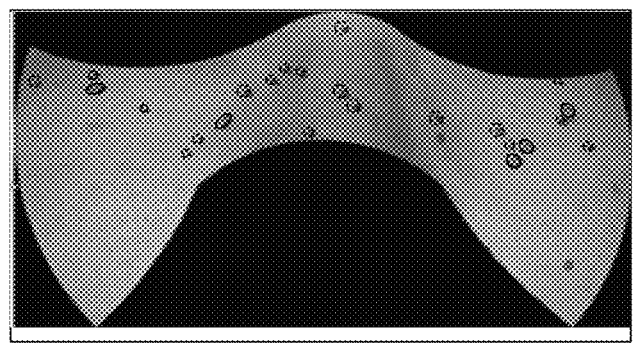
FIG. 9 is a schematic diagram of a skin speckle and a subcutaneous speckle according to an embodiment of this application.

S304: Determine a skin speckle and a subcutaneous speckle in the speckle feature image. For example, a speckle region in the speckle feature image may be first determined. Then, for each speckle region, a channel b average value of pixel points in the speckle region is determined. It may be determined that a speckle region whose channel b average value is greater than a first threshold is the skin speckle, and a speckle region whose channel b average value is less than or equal to the first threshold is the subcutaneous speckle. When the speckles are marked on the face image, the skin speckle and the subcutaneous speckle may be separately displayed in different display modes. For example, the skin speckle is marked by using a solid frame, and the subcutaneous speckle is marked by using a dashed frame, as shown in FIG. 9. Alternatively, the skin speckle is marked by using a red mark, and the subcutaneous speckle is marked by using a blue mark.

In this embodiment of this application, the speckle feature of the to-be-detected image is extracted from the Lab color space, so that not only the skin speckle in the to-be-detected image can be detected, but also the subcutaneous speckle in the to-be-detected image can be detected. In this way, a speckle status of a face may be determined by comprehensively considering the skin speckle and the subcutaneous speckle. Therefore, compared with the prior art in which the speckle status can be detected only based on a detected skin speckle, this application helps increase accuracy of speckle detection.

In an implementation, determining the speckle region in the speckle feature image may be implemented by using the following steps B1 to B4:

B1: Set a detection frame whose size is n×n, where the detection frame moves in the speckle feature image at a preset step, and n is a positive integer not greater than W or not greater than H. For example, the detection frame slides lower right at the preset step starting from the upper left corner of the speckle feature image. In each sliding process, an average value of pixel values of pixel points and a variance of the pixel values in the detection frame are calculated, to screen a first pixel point that satisfies the following formula:

$$r1 < (a1 - T1 \times b1), \text{ where}$$

r1 is a pixel value of the first pixel point, a1 is the average value of the pixel values of the pixel points in the detection frame, T1 is a preset value, and b1 is the variance of the pixel values of the pixel points in the detection frame.

B2: Calculate an average value of pixel values and a variance of the pixel values of pixel points in the speckle feature image, to screen a second pixel point that satisfies the following formula:

$$r2 < (a2 - T2 \times b2), \text{ where}$$

r2 is a pixel value of the second pixel point, a2 is the average value of the pixel values of the pixel points in the speckle feature image, T2 is a preset value, and b2 is the variance of the pixel values of the pixel points in the speckle feature image.

B3: Determine the first pixel point and the second pixel point as speckles.

B4: Perform an expansion operation on the speckle, and perform a corrosion operation on a speckle on which the expansion operation is performed, to obtain the speckle region.

Optionally, after the speckle region in the speckle feature image is determined, one or more of the following three types of speckle regions may be removed: a speckle region whose area is less than a second threshold, a speckle region whose area is greater than a third threshold, and a speckle region whose ratio of an area to a circumference is less than a fourth threshold, where the second threshold is less than the third threshold. An area of a speckle on a face is generally within a specific range, and a shape of the speckle is generally approximately a circle. Therefore, a region with an excessively small area, an excessively large area, or relatively low roundness in the speckle region is removed, so that accuracy of speckle detection can be increased.

Figure 2:
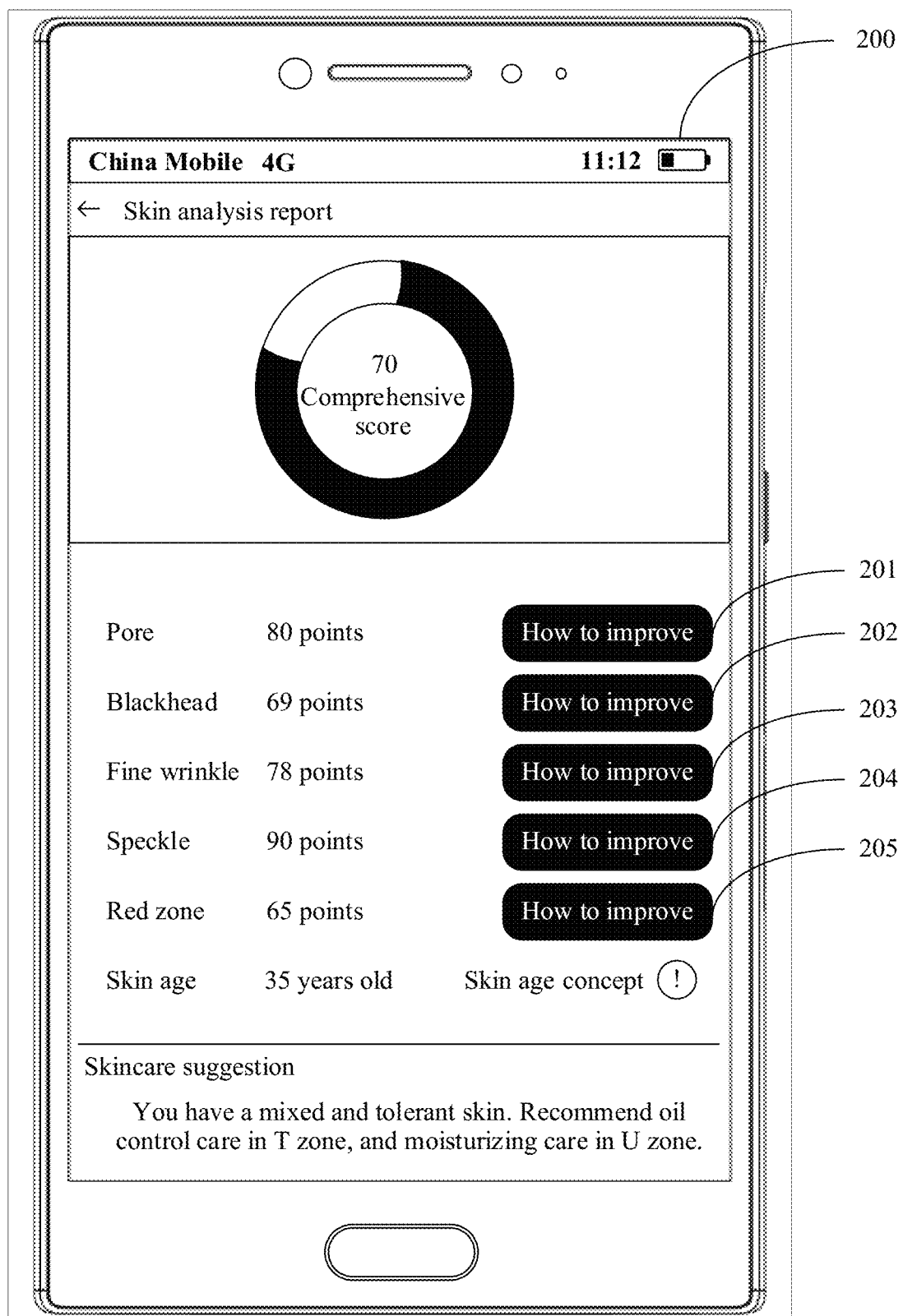
FIG. 2 is a schematic diagram of a user interface according to an embodiment of this application.
Figure 10:
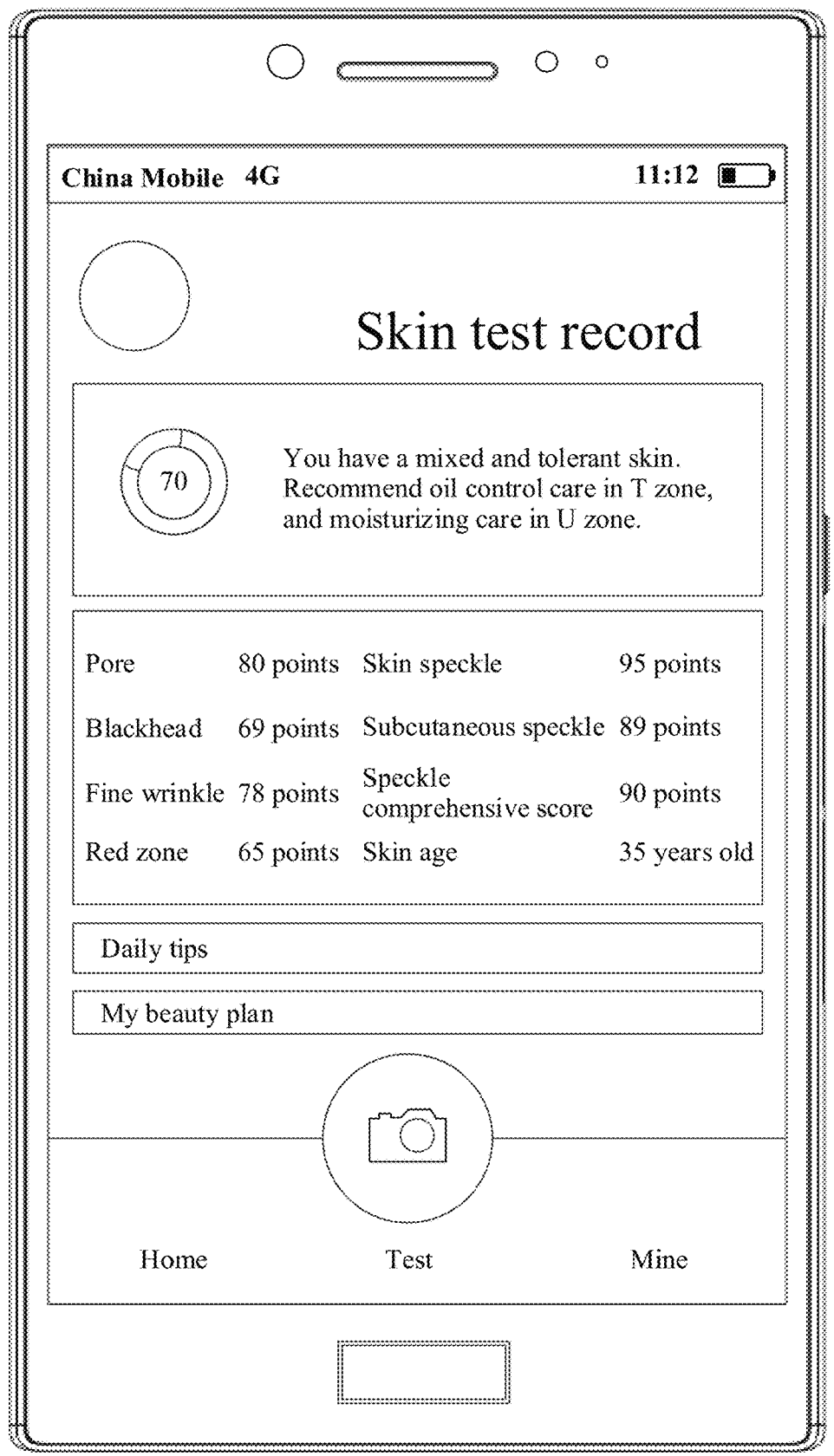
FIG. 10 is a schematic diagram of a user interface for displaying a speckle score according to an embodiment of this application.
Figure 11:
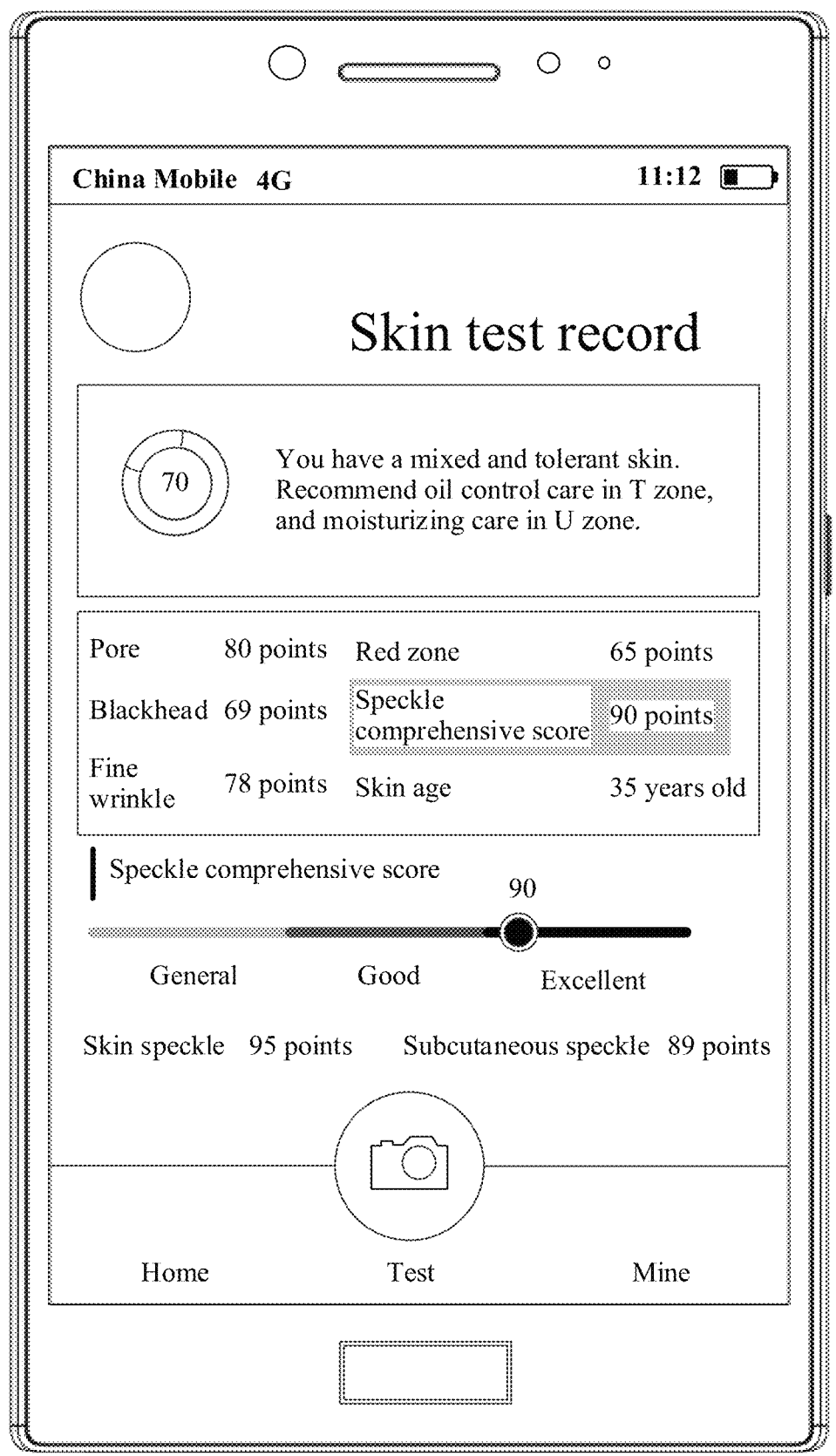
FIG. 11 is a schematic diagram of another user interface for displaying a speckle score according to an embodiment of this application.

In a possible implementation, after the skin speckle and the subcutaneous speckle in the speckle feature image are determined, scores may be separately quantized for the skin speckle and the subcutaneous speckle. Then, a comprehensive score of the speckles is determined by combining the score of the skin speckle and the score of the subcutaneous speckle. The comprehensive score of the speckles may be displayed in a user interface presented on the display screen 194, for example, as shown in FIG. 2. When the comprehensive score of the speckles is displayed in the user interface presented on the display screen 194, the score of the skin speckle and the score of the subcutaneous speckle may be displayed simultaneously, for example, as shown in FIG. 10. Alternatively, the electronic device 100 may also display, in response to the operation of the user, the score of the skin speckle and the score of the subcutaneous speckle in the user interface presented on the display screen 194, and may further mark, in response to the operation of the user, a level corresponding to the comprehensive score of the speckles in the user interface presented on the display screen 194, for example, average, good, and excellent. For example, the electronic device 100 detects that the user selects a display region that is in the user interface presented on the display screen 194 and that displays the comprehensive score of the speckles, and triggers the display screen 194 to display the score of the skin speckle, the score of the subcutaneous speckle, and the level corresponding to the comprehensive score of the speckles, as shown in FIG. 11.

In an implementation, the score of the skin speckle may be quantized in the following manner: determining a first feature set, where the first feature set includes one or more of the following features: a uniformity value used to represent pigment uniformity of the speckle feature image, a quantity of skin speckles, a speckle area of the skin speckle, and a contrast value of the skin speckle, and the contrast value of the skin speckle is used to represent color contrast of the skin speckle. Then, the score of the skin speckle is quantized based on the first feature set.

The contrast value of the skin speckle may be determined in the following manner: determining an average value of first pixel values of pixel points in each skin speckle and an average value of second pixel values of pixel points in the speckle feature image; and determining a ratio of the average value of the first pixel values to the average value of the second pixel values, to obtain the contrast value of the skin speckle.

The uniformity value may be determined in the following manner: dividing the speckle feature image into several overlapping rectangular regions, and determining a standard deviation of pixel values of pixel points in each rectangular region; and determining an average value of the standard deviations of the pixel values of all the rectangular regions, to obtain the uniformity value. Two adjacent rectangular regions may overlap by 50%, or may overlap by 30%. Certainly, an overlapping area of the two adjacent rectangular regions may be another value. A value of the overlapping area of the two adjacent rectangular regions is not specifically limited in this embodiment of this application.

For example, the score of the skin speckle may be determined according to the following formula:

$$H_1 = w_1 \times A + w_2 \times B_1 + w_3 \times C_1 \times \frac{D_1}{E},$$

where $H_1$ is the score of the skin speckle, A is the uniformity value, $B_1$ is the quantity of skin speckles, $C_1$ is a sum of contrast values of all the skin speckles, $D_1$ is a sum of areas of all the skin speckles, E is an area of the speckle feature image, and $w_1$, $w_2$, and $w_3$ are all preset parameters.

In an implementation, the score of the subcutaneous speckle may be quantized in the following manner: determining a second feature set, where the second feature set includes at least one of the following features: a uniformity value, a quantity of subcutaneous speckles, a speckle area of the subcutaneous speckle, or a contrast value of the subcutaneous speckle, and the contrast value of the subcutaneous speckle is used to represent color contrast of the subcutaneous speckle. Then, the score of the subcutaneous speckle is quantized based on the second feature set.

The contrast value of the subcutaneous speckle may be determined in the following manner: determining an average value of third pixel values of pixel points in each subcutaneous speckle, and the average value of the second pixel values; and determining a ratio of the average value of the third pixel values to the average value of the second pixel values, to obtain the contrast value of the subcutaneous speckle.

For example, the score of the subcutaneous speckle may be determined according to the following formula:

$$H_2 = w_1 \times A + w_4 \times B_2 + w_5 \times C_2 \times \frac{D_2}{E},$$

where $H_2$ is the score of the subcutaneous speckle, $B_2$ is the quantity of subcutaneous speckles, $C_2$ is a sum of contrast values of all the subcutaneous speckles, $D_2$ is a sum of areas of all the subcutaneous speckles, and both $w_3$ and $w_4$ are preset parameters.

For example, the comprehensive score of the speckles may be determined according to the following formula:

$H = y_1 \times H_1 + y_2 \times H_1$, where

H is the comprehensive score, and both $y_1$ and $y_2$ are preset parameters.

Figure 12:
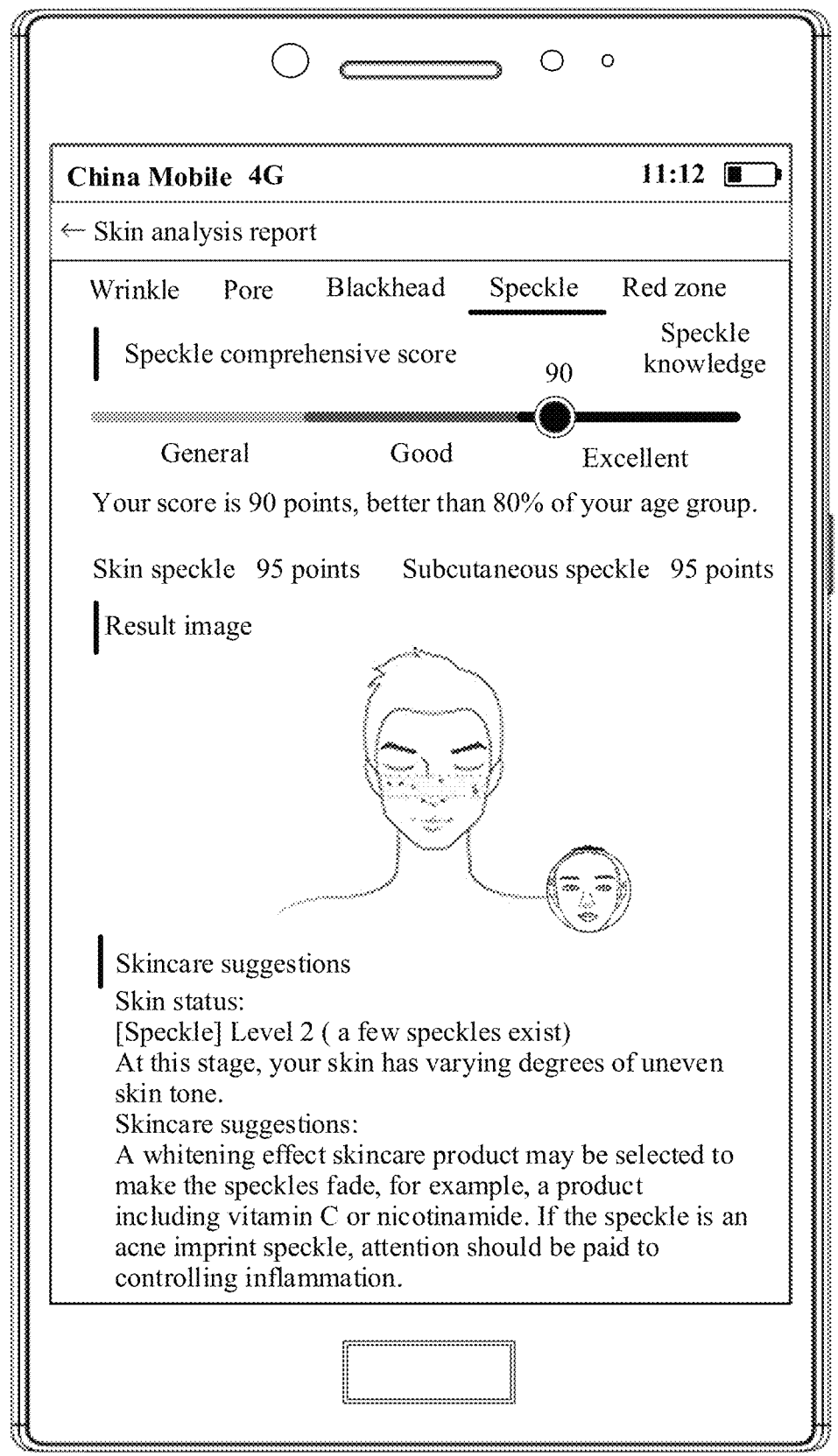
FIG. 12 is a schematic diagram of a user interface for displaying a speckle detection result according to an embodiment of this application.

After the speckle is detected by using the speckle detection method provided in this embodiment of this application, a speckle detection result report may be further provided to the user. The speckle detection result report may include but is not limited to the comprehensive score of the speckles, the score of the subcutaneous speckle, the score of the skin speckle, a skincare suggestion, a result image, and the like. The display screen 194 may present the face image of the user in the user interface, and present the face image by separately marking the skin speckle and the subcutaneous speckle in different display modes. The speckle detection result report may be a user interface 1200 shown in FIG. 12. The user interface 1200 may be triggered and presented when the electronic device 100 detects that the user taps the virtual button 204 shown in FIG. 2, or may be triggered and presented when the electronic device 100 detects that the user taps a display region in which the score of the speckle is located in the user interface. The user interface 200 shown in FIG. 2 is used as an example. The user interface 1200 is triggered and displayed when the electronic device 100 detects that the user taps a display region in which "speckle . . . 90" is located on the display screen 194. Certainly, the user interface 1200 may alternatively be triggered and presented in another manner. A manner of triggering and presenting the user interface 1200 is not specifically limited in this embodiment of this application.

The foregoing embodiments may be used in combination, or may be used independently.

In the embodiments provided in this application, the method provided in the embodiment of this application is described from a perspective in which the electronic device is used as an execution body. To implement functions in the method provided in the embodiment of this application, the electronic device may include a hardware structure and/or a software module, and implement the functions in a form of the hardware structure, the software module, or a combination of the hardware structure and the software module. Whether a function in the foregoing functions is performed in a manner of the hardware structure, the software module, or the combination of the hardware structure and the software module depends on a specific application and a design constraint condition of the technical solutions.

Figure 13:
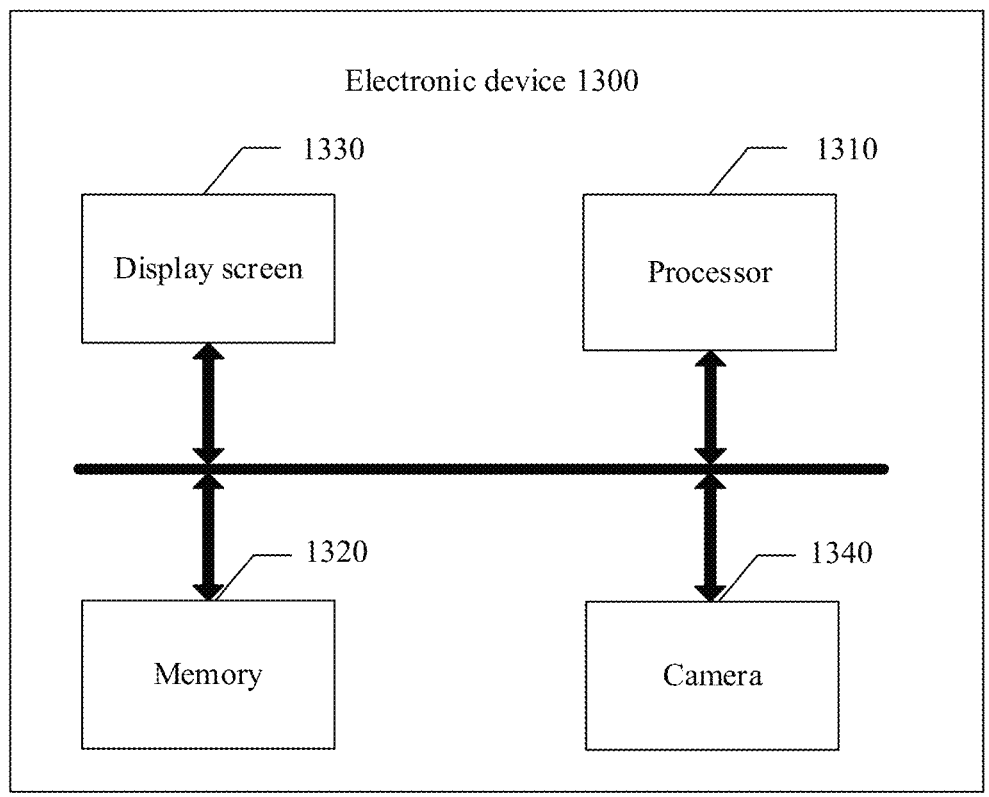
FIG. 13 is a schematic structural diagram of another electronic device according to an embodiment of this application.

Based on a same concept, FIG. 13 shows an electronic device 1300 according to this application. For example, the electronic device 1300 includes at least one processor 1310 and a memory 1320, and may further include a display screen 1330 and a camera 1340. The processor 1310 is coupled to the memory 1320, the display screen 1330, and the camera 1340. A coupling in this embodiment of this application is an indirect coupling or a communication connection between apparatuses, units, or modules, may be in an electrical form, a mechanical form, or another form, and is used for information exchange between the apparatuses, the units, or the modules.

Specifically, the memory 1320 is configured to store a program instruction.

The display screen 1330 is configured to display a photographing preview interface, where the photographing preview interface includes an image collected by using the camera 1340. The display screen 1330 may be further configured to display the user interfaces in the foregoing embodiments, for example, the user interface shown in FIG. 2, the user interface shown in FIG. 4A-1 and FIG. 4A-2, the user interface shown in FIG. 10, the user interface shown in FIG. 11, and the user interface shown in FIG. 12.

The processor 1310 is configured to invoke the program instruction stored in the memory 1320, so that the electronic device 1300 performs the steps in the speckle detection method shown in FIG. 3.

It should be understood that the electronic device 1300 may be configured to implement the speckle detection method shown in FIG. 3 in the embodiment of this application. For related features, refer to the foregoing descriptions. Details are not described herein.

A person skilled in the art may clearly know that the embodiments of this application may be implemented by using hardware, firmware, or a combination thereof. When the embodiments are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used in the embodiments of this application includes a compact disc (compact disc, CD), a laser disc, an optical disc, a digital video disc (digital video disc, DVD), a floppy disk and a Blu-ray disc, where the disk generally reproduces data magnetically, and the disc reproduces data optically by using laser. The foregoing combination should also be included in the protection scope of the computer-readable medium.

In summary, what is described above is merely embodiments of this application, but is not intended to limit the protection scope of this application. Any modification, equivalent replacement, or improvement made according to the disclosure of this application shall fall within the protection scope of this application.

What is claimed is:

1. A speckle detection method, comprises:
    obtaining a to-be-detected image;
    converting the to-be-detected image into Lab color space to obtain a Lab image;
    extracting a speckle feature from the Lab image to obtain a speckle feature image, comprising separately extracting detail feature components of a channel L, a channel a, and a channel b in the Lab image to obtain the speckle feature image, wherein the speckle feature image comprises a skin speckle feature and a subcutaneous speckle feature; and
    determining a skin speckle and a subcutaneous speckle in the speckle feature image, comprising
        determining one or more speckle regions in the speckle feature image,
        for each of the one or more speckle regions, determining a channel b average value of pixel points of the respective speckle region, determining the respective speckle region whose channel b average value is greater than a first threshold as the skin speckle, and determining the respective speckle region whose channel b average value is less than or equal to the first threshold as the subcutaneous speckle.

2. The method of claim 1, extracting the speckle feature to obtain the speckle feature image further comprises:
    determining a channel L difference between the channel L and the extracted detail feature component of the channel L, a channel a difference between the channel a and the extracted detail feature component of the channel a, and a channel b difference between the channel b and the extracted detail feature component of the channel b; and
    obtaining the speckle feature image based on the channel L difference, the channel a difference, and the channel b difference, wherein the channel L in the speckle feature image is the channel L difference, the channel a in the speckle feature image is the channel a difference, and the channel b in the speckle feature image is the channel b difference.

3. The method of claim 2, wherein the method further comprises:
    separately performing bilateral filtering processing on the channel L, the channel a, and the channel b in the Lab image, to obtain the detail feature component of the channel L, the detail feature component of the channel a, and the detail feature component of the channel b.

4. The method of claim 2, wherein determining the one or more speckle regions further comprises:
    determining a first pixel point in a detection frame, wherein a length of the detection frame is less than a length of the speckle feature image, a width of the detection frame is less than a width of the speckle feature image, the detection frame moves in the speckle feature image at a preset step, and a pixel value of the first pixel point satisfies the following formula:

$$r1 < (a1 - T1 \times b1), \text{ wherein}$$

r1 is the pixel value of the first pixel point, a1 is an average value of pixel values of pixel points in the detection frame, T1 is a preset value, and b1 is a variance of the pixel values of the pixel points in the detection frame;

determining a second pixel point in the speckle feature image, wherein a pixel value of the second pixel point satisfies the following formula:

r2<(a2−T2×b2), wherein r2 is the pixel value of the second pixel point, a2 is an average value of pixel values of pixel points in the speckle feature image, T2 is a preset value, and b2 is a variance of the pixel values of the pixel points in the speckle feature image;

determining the first pixel point and the second pixel point as speckles; and performing an expansion operation on one of the speckles, and performing a corrosion operation on that speckle on which the expansion operation is performed, to obtain the speckle region.

5. The method of claim 2, wherein the method further comprises:

removing the respective speckle region whose area is less than a second threshold and/or whose area is greater than a third threshold, wherein the second threshold is less than the third threshold; and/or removing the respective speckle region whose ratio of an area to a circumference is less than a fourth threshold.

6. The method of claim 1, wherein the method further comprises:

determining a first feature set, and quantizing a score of the skin speckle based on the first feature set, wherein the first feature set comprises at least one of the following features: a uniformity value, a quantity of skin speckles, a speckle area of the skin speckle, or a contrast value of the skin speckle, the uniformity value is used to represent pigment uniformity of the speckle feature image, and the contrast value of the skin speckle is used to represent color contrast of the skin speckle;

determining a second feature set, and quantizing a score of the subcutaneous speckle based on the second feature set, wherein the second feature set comprises at least one of the following features: the uniformity value, a quantity of subcutaneous speckles, a speckle area of the subcutaneous speckle, or a contrast value of the subcutaneous speckle, and the contrast value of the subcutaneous speckle is used to represent color contrast of the subcutaneous speckle;

determining a comprehensive score of speckle detection based on the score of the skin speckle and the score of the subcutaneous speckle; and displaying the comprehensive score, or displaying the score of the skin speckle, the score of the subcutaneous speckle, and the comprehensive score.

7. The method of claim 6, wherein the score of the skin speckle is determined according to the following formula:

$$H_1 = w_1 \times A + w_2 \times B_1 + w_3 \times C_1 \times \frac{D_1}{E},$$

wherein $H_1$ is the score of the skin speckle, A is the uniformity value, $B_1$ is the quantity of skin speckles, $C_1$ is a sum of contrast values of all the skin speckles, $D_1$ is a sum of areas of all the skin speckles, E is an area of the speckle feature image, and $w_1$, $w_2$, and $w_3$ are all preset parameters;

the score of the subcutaneous speckle is determined according to the following formula:

$$H_2 = w_1 \times A + w_4 \times B_2 + w_5 \times C_2 \times \frac{D_2}{E},$$

wherein $H_2$ is the score of the subcutaneous speckle, $B_2$ is the quantity of subcutaneous speckles, $C_2$ is a sum of contrast values of all the subcutaneous speckles, $D_2$ is a sum of areas of all the subcutaneous speckles, and both $w_3$ and $w_4$ are preset parameters; and the comprehensive score is determined according to the following formula:

$H = y_1 \times H_1 + y_2 \times H_1$, wherein

H is the comprehensive score, and both $y_1$ and $y_2$ are preset parameters.

8. The method of claim 6, wherein the uniformity value in the first feature set or the second feature set is determined in the following manner:

dividing the speckle feature image into several overlapping rectangular regions;

determining a standard deviation of pixel values of pixel points in each rectangular region; and determining an average value of the standard deviations of the pixel values of all the rectangular regions, to obtain the uniformity value.

9. The method of claim 6, wherein the contrast value of the skin speckle in the first feature set is determined in the following manner:

determining an average value of first pixel values of pixel points in each skin speckle and an average value of second pixel values of pixel points in the speckle feature image; and determining a ratio of the average value of the first pixel values to the average value of the second pixel values, to obtain the contrast value of the skin speckle; and the contrast value of the subcutaneous speckle in the second feature set is determined in the following manner:

determining an average value of third pixel values of pixel points in each subcutaneous speckle, and the average value of the second pixel values; and determining a ratio of the average value of the third pixel values to the average value of the second pixel values, to obtain the contrast value of the subcutaneous speckle.

10. The method of claim 1, wherein the method further comprises:

converting the to-be-detected image into a grayscale image; and removing a pixel point whose pixel value is greater than a fifth threshold from the grayscale image.

11. An electronic device, comprising:

a non-transitory memory comprising instructions; and a processor coupled to the non-transitory memory, the instructions being executed by the processor to cause the electronic device to:

obtain a to-be-detected image;

convert the to-be-detected image into Lab color space to obtain a Lab image;

extract a speckle feature from the Lab image to obtain a speckle feature image, to extract the speckle feature comprising separately extracting detail feature components of a channel L, a channel a, and a channel b in the Lab image to obtain the speckle feature image, wherein the speckle feature image comprises a skin speckle feature and a subcutaneous speckle feature; and determine a skin speckle and a subcutaneous speckle in the speckle feature image, wherein to determine the skin speckle and the subcutaneous speckle comprises to determine one or more speckle regions in the speckle feature image, for each of the one or more speckle regions, determine a channel b average value of pixel points of the respective speckle region, determine the respective speckle region whose channel b average value is greater than a first threshold as the skin speckle, and determine the respective speckle region whose channel b average value is less than or equal to the first threshold as the subcutaneous speckle.

12. The electronic device of claim 11, wherein to extract the speckle feature to obtain the speckle feature image further comprises to:

determine a channel L difference between the channel L and the extracted detail feature component of the channel L, a channel a difference between the channel a and the extracted detail feature component of the channel a, and a channel b difference between the channel b and the extracted detail feature component of the channel b; and obtain the speckle feature image based on the channel L difference, the channel a difference, and the channel b difference, wherein the channel L in the speckle feature image is the channel L difference, the channel a in the speckle feature image is the channel a difference, and the channel b in the speckle feature image is the channel b difference.

13. The electronic device of claim 12, the instructions further cause the electronic device to:

separately perform bilateral filtering processing on the channel L, the channel a, and the channel b in the Lab image, to obtain the detail feature component of the channel L, the detail feature component of the channel a, and the detail feature component of the channel b.

14. The electronic device of claim 11, the instructions further cause the electronic device to:

convert the to-be-detected image into a grayscale image; and remove a pixel point whose pixel value is greater than a fifth threshold from the grayscale image.

15. A computer program product for speckle detecting, the computer program product being embodied in a non-transitory computer readable medium and comprising computer instructions for:

obtaining a to-be-detected image;

converting the to-be-detected image into Lab color space to obtain a Lab image;

extracting a speckle feature from the Lab image to obtain a speckle feature image, comprising separately extracting detail feature components of a channel L, a channel a and a channel b in the Lab image to obtain the speckle feature image, wherein the speckle feature image comprises a skin speckle feature and a subcutaneous speckle feature; and determining a skin speckle and a subcutaneous speckle in the speckle feature image, comprising determining one or more speckle regions in the speckle feature image, for each of the one or more speckle regions, determining a channel b average value of pixel points of the respective speckle region, determining the respective speckle region whose channel b average value is greater than a first threshold as the skin speckle, and determining the respective speckle region whose channel b average value is less than or equal to the first threshold as the subcutaneous speckle.

16. The computer program product of claim 15, wherein extracting the speckle feature to obtain the speckle feature image further comprises:

determining a channel L difference between the channel L and the extracted detail feature component of the channel L, a channel a difference between the channel a and the extracted detail feature component of the channel a, and a channel b difference between the channel b and the extracted detail feature component of the channel b; and obtaining the speckle feature image based on the channel L difference, the channel a difference, and the channel b difference, wherein the channel L in the speckle feature image is the channel L difference, the channel a in the speckle feature image is the channel a difference, and the channel b in the speckle feature image is the channel b difference.

17. The computer program product of claim 16, the computer program product further comprises computer instructions for:

separately performing bilateral filtering processing on the channel L, the channel a, and the channel b in the Lab image, to obtain the detail feature component of the channel L, the detail feature component of the channel a, and the detail feature component of the channel b.

* * * * *